(12) United States Patent
Toishi et al.

(10) Patent No.: US 6,214,977 B1
(45) Date of Patent: Apr. 10, 2001

(54) BISAZO COMPOUNDS AND PROCESS FOR DYEING OR PRINTING USING THEM

(75) Inventors: Kouji Toishi, Hannan; Katsumi Agata, Kobe; Toshiyuki Araki, Kyotanabe, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/551,863

(22) Filed: Apr. 18, 2000

(30) Foreign Application Priority Data

Apr. 19, 1999 (JP) .................................. 11-110858
Nov. 19, 1999 (JP) .................................. 11-329929

(51) Int. Cl.⁷ .......................... C09B 62/513; D06P 1/384
(52) U.S. Cl. .............................................. 534/634; 8/549
(58) Field of Search .................................. 534/634; 8/549

(56) References Cited

U.S. PATENT DOCUMENTS

| | | | |
|---|---|---|---|
| 4,453,945 | * 6/1984 | Miyamoto et al. ............ | 8/543 |
| 4,622,930 | 11/1986 | Meininger et al. ............ | 534/634 |
| 4,631,065 | * 12/1986 | Seitz et al. .................... | 8/549 |
| 4,701,523 | 10/1987 | Segal et al. ................... | 534/634 |
| 4,730,038 | 3/1988 | Meininger et al. ............ | 534/637 |
| 4,754,023 | 6/1988 | Tzikas et al. ................. | 534/618 |
| 4,782,140 | 11/1988 | Tzikas ........................... | 534/637 |
| 4,786,721 | 11/1988 | Tsikas et al. ................. | 534/617 |
| 4,912,244 | 3/1990 | Tzikas ........................... | 558/23 |
| 5,073,631 | * 12/1991 | Scheibli ........................ | 534/634 |
| 5,095,101 | * 3/1992 | Von Tobel ..................... | 534/634 |
| 5,349,057 | 9/1994 | Buch et al. ................... | 534/637 |
| 5,459,244 | * 10/1995 | Kunde ........................... | 534/634 |

FOREIGN PATENT DOCUMENTS

| | | |
|---|---|---|
| 61-247760 | 11/1986 | (JP) . |
| 62-190259 | 8/1987 | (JP) . |
| 62-215661 | 9/1987 | (JP) . |

* cited by examiner

Primary Examiner—Fiona T. Powers
(74) Attorney, Agent, or Firm—Stevens, Davis, Miller & Mosher, L.L.P.

(57) ABSTRACT

A bisazo compound represented by the following general formula (1):

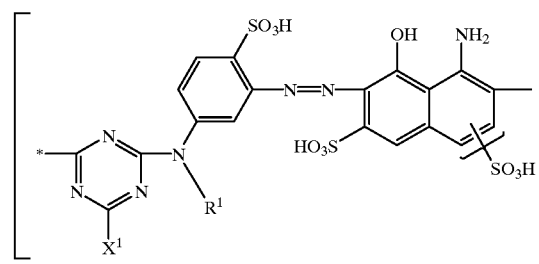

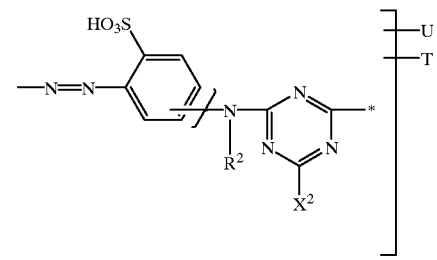

wherein the variables are as defined in the specification and a method for dyeing or printing a fiber material using them are provided.

10 Claims, No Drawings

BISAZO COMPOUNDS AND PROCESS FOR DYEING OR PRINTING USING THEM

BACKGROUND OF THE INVENTION

The present invention relates to dark-blue bisazo compounds or salts thereof usable in dyeing or printing on fiber materials, particularly cellulose fiber materials, and their applications on fiber materials.

As reactive dyes of dark-blue color usable in dyeing or printing on cellulose fiber materials, dyes disclosed in JP-A-57-78458, JP-A-57-198757 and the like have been known.

The present inventors have conducted extensive researches for developing bisazocompounds or salts thereof capable of giving dyed products of dark-blue color which are superior in dyeing power, dyeing reproducibility, leveling property and dyeing performances such as build-up property, effective dyeing rate and washing-off property compared with the known dark-blue dyes described above, and which are excellent in various fastness such as chlorine fastness, light fastness, perspiration fastness, perspiration-sunlight fastness, acid-hydrolysis fastness, alkali fastness, washing fastness and peroxide washing fastness. As the result, they have found that the aim can be attained with specific diazo compounds or salts thereof having two triazine rings and the one triazine ring being substituted with one vinylsulfone fiber-reactive group through a divalent connecting group. The present invention thus have been completed.

SUMMARY OF THE INVENTION

The present invention provides a bisazo compound represented by the following general formula (1):

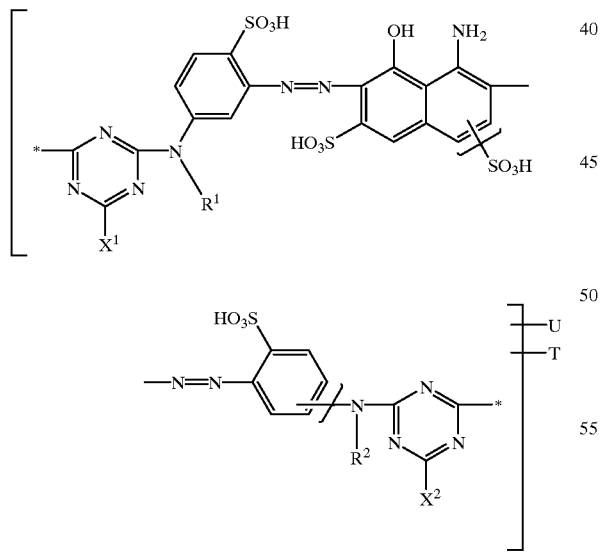

(1)

wherein $R^1$ and $R^2$, which are the same to or different from each other, represent hydrogen or alkyl which may be optionally substituted, U represents a group selected from the groups represented by the following formulae (2a), (2b) or (2c):

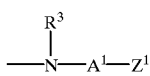

(2a)

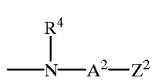

(2b)

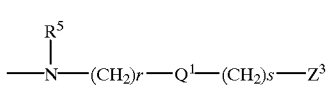

(2c)

wherein $R^3$ represents hydrogen or alkyl which may be optionally substituted, $R^4$ and $R^5$ represent hydrogen, alkyl which may be optionally substituted or phenyl, $A^1$ represents phenylene which may be optionally substituted or naphthylene which may be optionally substituted, $A^2$ represents alkylene which may be optionally substituted, $Q^1$ represents —O—, —S— or —$NR^6$— wherein $R^6$ represents hydrogen, alkyl which may be optionally substituted or phenyl which may be optionally substituted, r and s, which are the same to or different from each other, represent 2, 3 or 4, $Z^1$, $Z^2$ and $Z^3$ represent a fiber-reactive group selected from the groups represented by the following formulae (3a) or (3b):

(3a)

(3b), wherein $Y^1$ and $Y^2$, which are the same to or different from each other, represent —CH=$CH_2$ or —$CH_2CH_2L$ wherein L is a group which can be eliminated by the action of an alkali, $R^7$ represents hydrogen or alkyl having 1 to 4 carbon atoms, and m is an integer of 1 to 6, $X^1$ and $X^2$, which are the same to or different from each other, represent a group selected from fluoro, chloro, pyridinio which may be optionally substituted, T represents a non-fiber reactive group represented by the following formulae (4a), (4b) or (4c):

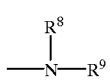

(4a)

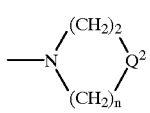

(4b)

(4c)

wherein $R^8$ represents hydrogen or alkyl which may be optionally substituted, $R^9$ represents alkyl which may be optionally substituted, cyano or phenyl which may be optionally substituted by one or two substituents selected from alkyl having 1 to 4 carbon atoms, alkoxy having 1 to 4 carbon atoms, carboxy, halogeno, hydroxyl, cyano, carbamoyl, carboxylic ester, amino, acylamino and alkylamino having 1 to 4 carbon atoms, $R^{10}$ represent hydrogen, alkyl which may be optionally substituted or phenyl which may be optionally substituted, $Q^2$ represents —$CH_2$—, —O—, —S—, —SO$_2$— or —NR$^{11}$— wherein R$^{11}$ represents hydrogen or alkyl which may be optionally substituted, and n is 1, 2 or 3, and one of the two bonds marked with a symbol * means a bond connected to —U and the other means a bond connected to —T;
, and a salt thereof.

The present invention also provides a method for dyeing or printing a fiber material using the bisazo compound represented by the formula (1) or a salt thereof.

DETAILED DESCRIPTION OF THE INVENTION

The bisazo compound of the present invention is a compound represented by the general formula (1), shown above.

In the formula (1), R$^1$ and R$^2$, which are the same to or different from each other, represent hydrogen or alkyl which may be optionally substituted. Said alkyl has preferably 1 to 4 carbon atoms. Examples of substituents on said alkyl include hydroxyl, cyano, alkoxy having 1 to 4 carbon atoms, hydroxyalkoxy having 1 to 4 carbon atoms, halogeno, carbamoyl, carboxy, alkoxycarbonyl wherein the alkoxy has 1 to 4 carbon atoms, alkylcarbonyloxy wherein the alkyl has 1 to 4 carbon atoms, sulfo and sulfamoyl.

The above alkyl, alkoxy as a substituent on said alkyl, alkoxycarbonyl wherein alkoxy has 1 to 4 carbon atoms and alkylcarbonyloxy wherein alkyl has 1 to 4 carbon atoms may be straight chain or branched chain.

Specific examples of alkyl which may be optionally substituted, represented by R$^1$ and R$^2$, include methyl, ethyl, n-propyl, isopropyl, n-butyl, isobutyl, sec-butyl, 2-hydroxyethyl, 2-(2-hydroxyethoxy)ethyl, 2-hydroxypropyl, 3-hydroxypropyl, 3-methoxypropyl, 3-ethoxypropyl, 2-hydroxybutyl, 3-hydroxybutyl, 1-hydroxymethyl-1-bmethylethyl, 1,1-di(hydroxymethyl)ethyl, 1,1-di(hydroxymethyl)-2-hydroxyethyl, 4-hydroxybutyl, 2,3-dihydroxybutyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

R$^1$ and R$^2$ in the formula (I) are preferably hydrogen, methyl or ethyl, with hydrogen being particularly preferred.

U in the formula (1) represents a group selected from the groups represented by the formulae (2a), (2b) or (2c), described above. R$^3$ in the formula (2a) represents hydrogen or alkyl which may be optionally substituted. R$^4$ in the formula (2b) and R$^5$ in the formula (2c) represent hydrogen, alkyl which may be optionally substituted, or phenyl.

Examples of said alkyl represented by R$^3$, R$^4$ or R$^5$ include alkyl same to those listed above as examples of R$^1$ and R$^2$ R$^3$, R$^4$ and R$^5$ are preferably hydrogen, methyl or ethyl.

In the formula (2a) described above, A$^1$ represents phenylene which may be optionally substituted or naphthylene which may be optionally substituted. Examples of the phenylene represented by A$^1$ include phenylene groups which may be optionally substituted with one or two substituents selected from alkyl having 1 to 4 carbon atoms, alkoxy having 1 to 4 carbon atoms, sulfo and halogeno, and the like.

Preferred examples of the phenylene represented by A$^1$ include unsubstituted phenylene and phenylene substituted with one or two substituents selected from methyl, ethyl, methoxy, ethoxy, chloro, bromo and sulfo.

Specific examples of the phenylene represented by A$^1$ include:

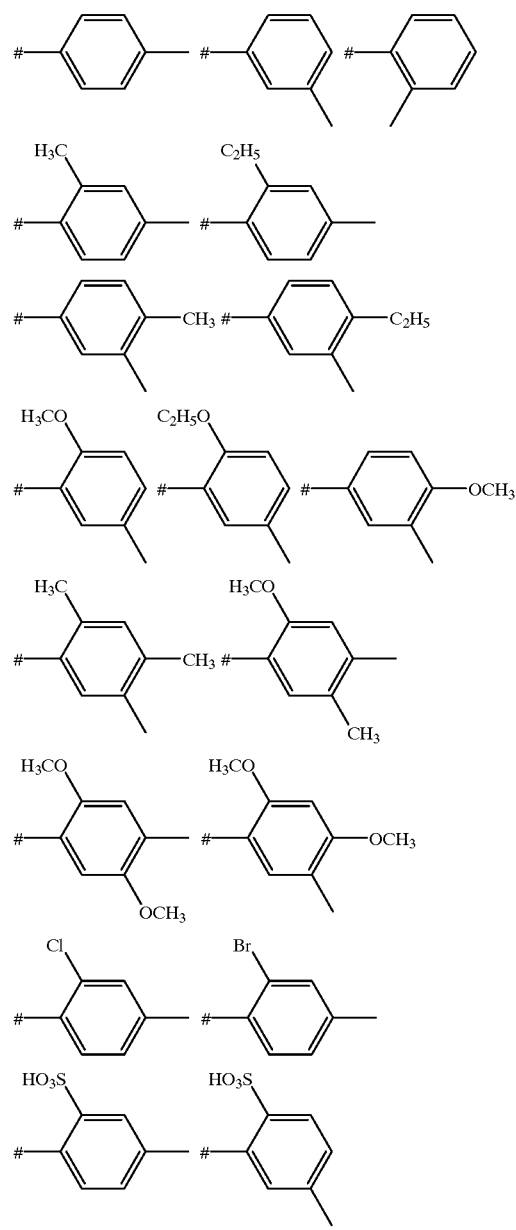

wherein bonds marked with symbol # mean bonds connected to the group of —NR$^3$—.

Particularly preferred examples of the phenylene include unsubstituted phenylene and phenylene substituted with one or two groups selected from methyl and methoxy.

Examples of the naphthylene represented by $A^1$ in the formula (2a) include naphthylene which may be bptionally substituted with one or two substituents selected from alkyl having 1 to 4 carbon atoms, alkoxy having 1 to 4 carbon atoms, sulfo, halogeno, and the like.

Preferred examples of the naphthylene represented by $A^1$ include naphthylene which may be optionally substituted with one or two sulfo.

Specific examples of the phenylene represented by $A^1$ include:

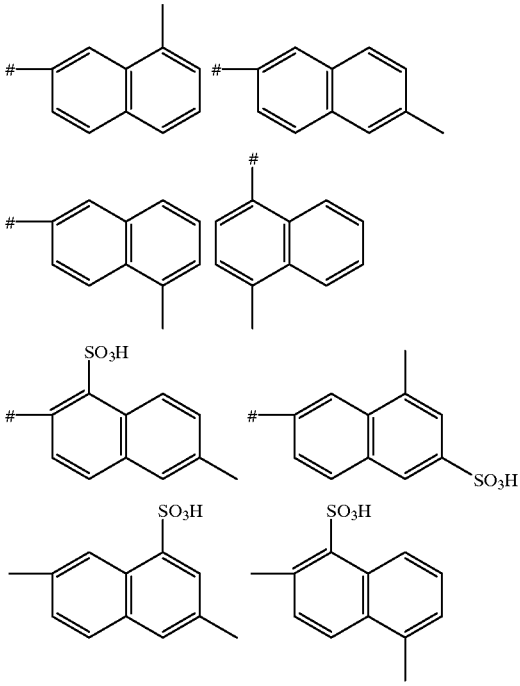

wherein bonds marked with a symbol # mean bonds connected to the group of —$NR^3$—.

More preferably, $A^1$ in the formula (2a) is phenylene which may be optionally substituted with one or two groups selected from methyl and methoxy. with unsubstituted phenylene being particularly preferred In the formula (2b) described above, $A^2$ represents alkylene which may be optionally substituted. Examples of the alkylene represented by $A^2$ include alkylene having 2 to 4 carbon atoms which may be optionally substituted with a substituent selected from alkyl having 1 to 4 carbon atoms, halogeno. hydroxyl, sulfo, cyano, alkoxy having 1 to 4 carbon atoms, alkoxycarbonyl wherein the alkoxy has 1 to 4 carbon atoms, alkylcarbonyloxy wherein the alkyl has 1 to 4 carbon atoms and carbamoyl.

Preferred examples of the alkylene represented by $A^2$ include unsubstituted alkylene having 2 to 4 carbon atoms and particularly preferred examples thereof include ethylene and trimethylene.

In the formula (2c) described above, $Q^1$ represents —O—, —S— or —$NR^6$— wherein $R^6$ represents hydrogen, alkyl which may be optionally substituted or phenyl which may be optionally substituted.

Examples of the alkyl represented by $R^6$ include alkyl having 1 to 4 carbon atoms same to those listed above as examples of $R^1$ and $R^2$.

Examples of the phenyl represented by $R^6$ include phenyl which may be optionally substituted with sulfo.

Preferred $R^6$ is hydrogen, methyl or ethyl.

In the formula (2c), r and s, which are the same to or different from each other, represent 2, 3 or 4.

Preferably, in the groups represented by —$(CH_2)_r$—$Q^1$—$(CH_2)_s$— in the formula (2c), $Q^1$ is —O— and r and s, which are the same to or different from each other, are 2 or 3. Specifically, preferred examples of the group include:

\*\*—$CH_2CH_2$—O—$CH_2CH_2$—
\*\*—$CH_2CH_2$—O—$CH_2CH_2CH_2$—
\*\*—$CH_2CH_2CH_2$—O—$CH_2CH_2$—
\*\*—$CH_2CH_2CH_2$—O—$CH_2CH_2CH_2$— wherein bonds marked with a symbol \*\* mean bonds connected to the group of —$NR^5$—. Amongst them, the group of the formula: \*\*—$CH_2CH_2$—O—$CH_2CH_2$— wherein the symbol \*\* has the same meaning as above is particularly preferred.

Among the groups represented by U, the groups represented by the above formulae (2a) or (2b) are preferred, with the group of the formula (2a) being particularly preferred.

When U is the group represented by the formula (2a), the group wherein $A^1$ is phenylene which may be optionally substituted and $R^3$ is hydrogen, methyl or ethyl is preferred.

When U is the group represented by the formula (2b), the group wherein $A^2$ is ethylene or trimethylene and $R^4$ is hydrogen, methyl or ethyl is preferred.

In the formulae (2a), (2b) and (2c), $Z^1$, $Z^2$ and $Z^3$ each represent a fiber-reactive group represented by the formula (3a) or (3b) wherein $Y^1$ and $Y^2$, which are the same to or different from each other, represent —$SO_2CH$=$CH_2$ or —$SO_2CH_2CH_2L$ wherein L is a group which can be eliminated by the action of an alkali.

Examples of the group represented by L, i.e. a group which can be eliminated by the action of an alkali, include sulfate ester, thiosulfate ester, phosphate ester, acetate ester and halogeno. Amongst them, sulfate ester group and chloro are preferred. $Z^1$, $Z^2$ and $Z^3$ are preferably —CH=$CH_2$, —$CH_2CH_2Cl$ or —$CH_2CH_2OSO_3H$. Amongst them, —$CH_2$=$CH_2$ and —$CH_2CH_2SO_3H$ are particularly preferred.

In the above formula (3b), m is an integer of 1 to 6, and $R^7$ represents hydrogen or alkyl which may be optionally substituted. Examples of alkyl represented by $R^7$ include alkyl having 1 to 4 carbon atoms which are same to the alkyl listed above as the examples for $R^1$ and $R^2$.

As the group represented by the formula (3b), a group wherein $R^7$ is hydrogen and m is 2 or 3 is particularly preferred.

As groups represented by $Z^1$, $Z^2$ and $Z^3$, the group represented by the formula (3a) is particularly preferred.

$X^1$ and $X^2$ in the above formula (1), which are the same to or different from each other, represent fluoro, chloro or pyridinio which may be optionally substituted. Examples of the above pyridinio group which may be optionally substituted includes pyridinio, 2-, 3- or 4-carboxypyridinio, 2-, 3- or 4-carbamoylpyridinio, 3-sulfopyridinio, 4-(2-sulfoethyl) pyridinio, 3-(2-hydroxyethyl)pyridinio, 4-chloropyridinio, 3-methylpyridinio and 3,5-dicarboxypyridinio. Among them, 3- or 4-carboxypyridinio is particularly preferred.

Particularly preferred groups represented by $X^1$ and $X^2$ are fluoro and chloro.

In the above formula (1), T represents a non-fiber reactive group represented by the above formula (4a), (4b) or (4c). $R^8$ in the formula (4a) represents hydrogen or alkyl which may be optionally substituted. Said alkyl preferably has 1 to 4 carbon atoms, and may be straight chain or branched chain.

Examples of such alkyl which may be optionally substituted include alkyl having 1 to 4 carbon atoms which may be optionally substituted with one or two substituents selected from alkoxy having 1 to 4 carbon atoms, sulfo, carboxy, sulfamoyl, carbamoyl, hydroxyl, halogeno, such as chloro, bromo or the like, cyano, carboxylic ester and sulfonic ester.

Specific examples of alkyl which may be optionally substituted represented by $R^8$ include same groups to the examples listed for $R^1$ and $R^2$.

Preferred examples of alkyl which may be optionally substituted include methyl, ethyl, n-propyl, isopropyl, n-butyl, isobutyl, sec-butyl, 2-hydroxyethyl, 2-sulfoethyl, 2-methoxyethyl, 2-carboxyethyl, 2-carbamoylethyl and 2-sulfamoylethyl.

$R^9$ in the above formula (4a) represents alkyl which may be optionally substituted, cyano, or phenyl which may be optionally substituted with one or two substituents selected from alkyl having 1 to 4 carbon atoms, alkoxy having 1 to 4 carbon atoms, carboxy, halogeno, hydroxyl, cyano, carbamoyl, carboxylic ester, amino, acylamino and alkylamino wherein alkyl has 1 to 4 carbon atoms.

Specific examples of alkyl represented by $R^9$ include the alkyl groups same to those listed above as the examples of $R^1$, $R^2$ or $R^8$.

Among them, methyl, ethyl, n-propyl, isopropyl, n-butyl, isobutyl, sec-butyl, tert-butyl, 2-hydroxyethyl, 2-82-hydroxyethoxy)ethyl, 1-hydroxymethyl-1-methylethyl, 1,1-di(hydroxymethyl)etyl, 1,1-di(hydroxymethyl)-2-hydroxyethyl, 2-sulfoethyl, 2-methoxyethyl, 2-carboxyethyl, 2-carbamoylethyl, 2-sulfamoylethyl, and the like are preferred as the alkyl represented by $R^9$.

Preferred examples of the phenyl represented by $R^9$ include phenyl, 2-, 3- or 4-methylphenyl, 2-, 3- or 4-methoxyphenyl, 2-, 3- or 4-ethylphenyl, 2-, 3- or 4-ethoxyphenyl, 2-, 3- or 4-isopropylphenyl, 2-, 3- or 4-carboxyphenyl, 2-, 3- or 4-carbamoylphenyl, 2-, 3- or 4-chlorophenyl, 2-, 3- or 4-hydroxyphenyl, 2-carboxy-4-acetylaminophenyl, 2-methoxy-5-methylphenyl, 2,4-dimethoxyphenyl and 2,5-dimethoxyphenyl.

As the groups represented by the formula (4a), those wherein $R^8$ is hydrogen, methyl or ethyl, and $R^9$ is alkyl which may be optionally substituted or cyano are preferred.

$R^{10}$ in the above formula (4c) represents hydrogen, alkyl which may be optionally substituted, or phenyl which may be optionally substituted. Examples of alkyl represented by $R^{10}$ include the alkyl groups same to examples for alkyl represented by $R^8$.

Examples of phenyl represented by $R^{10}$ include phenyl which may be optionally substituted with one or two groups selected from alkyl having 1 to 4 carbon atoms, alkoxy having 1 to 4carbonatoms, sulfo, carboxy, halogeno, hydroxyl, cyano, carbamoyl, sulfamoyl, carboxylic ester, 2-hydroxyethylsulfonyl, amino, acylamino, preferably alkylcarbonyl amino wherein the alkyl has 1 to 4 carbon atoms, and alkylamino wherein the alkyl has 1 to 4 carbon atoms.

Preferred examples of the phenyl represented by $R^{10}$ and $R^{11}$ include phenyl, 2-, 3- or 4-methylphenyl, 2-, 3- or 4-methoxyphenyl, 2-, 3- or 4-ethylphenyl, 2-, 3- or 4-ethoxyphenyl, 2-, 3- or 4-isopropylphenyl, 2-, 3- or 4-carboxyphenyl, 2-, 3- or 4-carbamoylphenyl, 2-, 3- or 4-chlorophenyl, 2-, 3- or 4-sulfophenyl, 2-, 3- or 4-hydroxyphenyl, 2-sulfo-4-methoxyphenyl, 2-sulfo-4-acetylaminophenyl, 2-carboxy-4-acetylaminophenyl, 2-methoxy-5-methylphenyl, 2,4-dimethoxyphenyl and 2,5-dimethoxyphenyl.

When T in the general formula (1) is a group represented by the formula (4a), examples of the amine compound represented by $HNR^8R^9$ used for forming this group include:

aromatic amines such as 1-aminobenzene, 1-amino-2-, -3- or -4-methylbenzene, 1-amino-2,4-, -3,4- or -3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-proplbenzene, 1-amino-2-, -3- or -4-isopropylbenzene, 1-amino-2-, -3- or -4-chlorobenzene, 1-amino-2-, -3- or -4-bromobenzene, 1-amino-2-, -3- or -4-fluorobenzene, 1-amino-2,4- or -2,5-dimethoxybenzene, 1-amino-2-methoxy-5-methylbenzene, 2-, 3- or 4-aminobenzoic acid, 2-, 3- or 4-carbamoylaniline, 1-amino-2-carboxy-4-acetylaminobenzene, 5-aminobenzene-1,3-dicarboxylic acid, N-methylaminobenzene, N-ethylaminobenzene, 1-methylamino-3- or -4-methylbenzene, 1-ethylamino-3- or -4-methylbenzene, 1-methylamino-2-, -3- or -4-chlorobenzene, 1-ethylamino-2-, -3- or -4-chlorobenzene, 1-(2-hydroxyethyl)amino-3-methylbenzene, 3- or 4-methylaminobenzoic acid, 1-amino-2-methoxy-5-methylbenzene, 1-amino-2,5-dimethoxybenzene, 2-, 3- or 4-aminophenol and 1-amino-3- or -4-acetylaminobenzene;

cyanamide; and aliphatic amines such as methylamine, ethylamine, n-propylamine, isopropylamine, n-butylamine, isobutylamine, sec-butylamine, dimethylamine, diethylamine, methylethylamine, allylamine, 2-cloroethylamine, 2-methoxyethylamine, 2-aminoethanol, 2-(2-aminoethoxy)ethanol, 2-methylaminoethanol, bis(2-hydoxyethyl)amine, 2-amino-2-methylpropanol, 2-amino-2-methyl-1,3-propane-diol, 2-amino-2-hydroxymethyl-1,3-propane-diol, 2-aceytlaminoethylamine, 1-amino-2-propanol, 3-methoxypropylamine, 1-amino-3-dimethylaminopropane, 2-aminoethanesulfonamide, 2-aminoethanesulfonic acid, aminomethanesulfonic acid, 2-methylaminoethanesulfonamide, 2-methylaminoethanesulfonic acid, 3-amino-1-propanesulfonic acid, 2-sulfate ethylamine, aminoacetic acid, methylaminoacetic acid, 3-aminopropionic acid, 3-aminopropionamide, 3-methylaminopropionamide, ε-aminocapronic acid, benzylamine, 2-, 3- or 4-sulfobenzylamine, 2-, 3- or 4-chlorobenzylamine, 2-, 3- or 4-methylbenzylamine, N-methybenzylamine, 1-phenylethylamine, 2-phenylethylamine, and 1-phenyl-2-propylamine.

Preferred examples of the amine compounds represented by $HNR^8R^9$ include 1-aminobenzene, N-methylaminobenzene, N-ethylaminobenzene, 1-amino-2-, -3- or -4-chlorobenzene, 1-methylamino-2-, -3- or -4-chlorobenzene, 1-ethylamino-2-, -3- or -4-chlorobenzene, 1-amino-2-, -3- or -4-methylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-propylbenzene, 1-amino-2-, -3- or -4-isopropylbenzene, 2-, 3- or 4-aminophenol, 2-, 3- or 4-aminobenzoic acid, 2-, 3- or 4-carbamoylaniline, 1-amino-2,4- or -2,5-dimethoxybenzene, 1-amino-2-carboxy-4-acetylaminobenzene, 1-amino-2-methoxy-5-methylbenzene, cyanamide, methylamine, ethylamine, dimethylamine, isobutylamine, sec-butylamine, tert-butylamine, diethylamine, methylethylamine, 2-amino-2-methylpropanol, 2-amino-2-methyl-1,3-propanediol, 2-amino-2-hydroxymethyl-1,3-propanediol, 2-aminoethanesulfonic acid, (2-methylamino) ethanesulfonic acid, 2-methylaminoethanol, bis(2-hydroxyethyl)amine, 2-sulfamoylethylamine, 2-carbamoylethylamine, aminoacetic acid, methylaminoacetic acid and 3-aminopropionic acid.

Among them, particularly preferred are 1-aminobenzene, N-methylaminobenzene, N-ethylaminobenzene, 1-amino-2-, -3- or -4-ethylbenzene, 2-, 3- or 4-aminobenzoic acid, cyanamide, methylamine, ethylamine, dimethylamine, tert-butylamine, 2-amino-2-methylpropanol, 2-amino-2-methyl-1,3-propanediol, 2-amino-2-hydroxymethyl-1,3-propanediol, 2-aminoethanesulfonic acid, (2-methylamino) ethanesulfonic acid, 2-methylaminoethanol, bis(2-hydroxyethyl)amine and aminoacetic acid.

$R^{10}$ is more preferably hydrogen or alkyl having 1 to 4 carbon atoms, and among them, methyl or ethyl is particularly preferred.

When T in the general formula (1) is a group represented by the formula (4c), examples of the compound represented by $HOR^{12}$ used for forming this group include: phenols such as phenol, 1-hydroxy-2-, -3- or -4-methylbenzene, 1-hydroxy-3,4- or -3,5-diemthylbenzene, 1-hydroxy-2-, -3- or -4-ethylbenzene, 1-hydroxy-2-, -3- or -4-methoxybenzene, 1-hydroxy-2-, -3- or -4-ethoxybenzene, 1-hydroxy-2-, -3- or -4-chlorobenzene, 3- or 4-hydroxyphenylmethanesulfonic acid, 3- or 4-hydroxybenzenesulfonic acid, 5-hydroxybenzene-1,3-disulfonic acid, 2-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, and 5-hydroxy-2-ethoxybenzenesulfonic acid; and aliphatic alcohols such as methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethaneuslfonic acid, 3-hydroxyethoxypropanol, 3-hydroxy-1-propanesulfonic acid, 2-cyanoethanol, 2-sulfateethanol, glycolic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenylethanol and 1-phenyl-2-propanol.

In the general formula (4b), $Q^2$ represents —$CH_2$—, —O—, —S—, —$SO_2$— or —$NR^{11}$—, wherein $R^{11}$ represents hydrogen or alkyl which may be optionally substituted, and n is 1, 2 or 3. The alkyl represented by $R^{11}$ preferably has 1 to 4 carbon atoms. Examples of the substituent of this alkyl include halogeno such as chloro and bromo and alkoxy having 1 to 4 carbon atoms. Examples of $R^{11}$ include hydrogen and straight or branched $C_1$ to $C_4$ unsubstituted alkyl, with hydrogen, methyl and ethyl being particularly preferred.

Specific examples of the group represented by formula (4b) include residual groups derived from pyrrolidine, piperidine, piperazine, n-alkylpiperazine and morpholine. Among them, groups in which q is 2 and $Q^2$ is —O— or —$CH_2$—, namely, morpholino or piperidino is particularly preferable.

As the group represented by T in the formula (1), a group represented by the formula (4a) or (4b) is particularly preferred.

For dyeing or printing fiber materials, the bisazo compound of the formula (1), that is, the free acid, salts thereof or a mixture thereof may be used. Preferably, the bisazo compound or a salt thereof is in the form of an alkaline metal salt, an alkaline earth metal salt or a mixture containing them. Among them, a sodium salt, potassium salt, lithium salt and a mixture containing them are particularly preferred.

Preferred examples of the bisazo compound represented by the formula (1) in the present invention include compounds represented by the following formula (1a-1) or (1a-2):

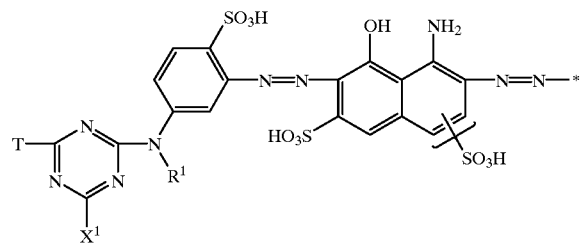
(1a-1)

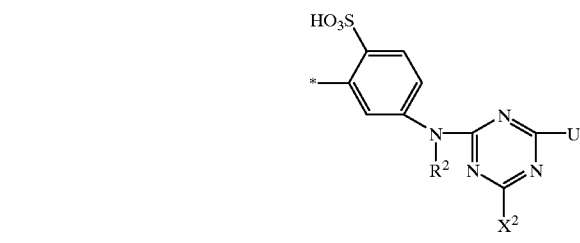

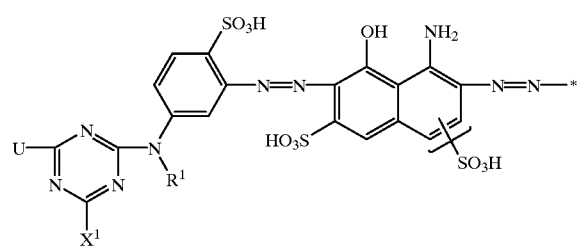
(1a-2)

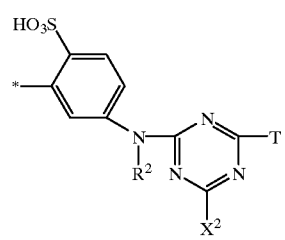

wherein the symbol *, $R^1$, $R^2$, $X^1$, $X^2$, U and T have the same meaning as above.

Particularly preferred compounds represented by the formulae (1a-1) and (1a-2) are those wherein $R^1$ and $R^2$ are hydrogen; U is a group represented by the formula (2a) wherein $A^1$ is phenylene, $R^3$ is hydrogen, methyl or ethyl, and $Z^1$ is —$SO_2CH=CH_2$ or —$SO_2CH_2CH_2OSO_3H$; $X^1$ and $X^2$ are fluoro or chloro; and T is a group represented by the formula (4a) wherein $R^8$ is hydrogen and $R^9$ is alkyl which may be optionally substituted, or a group represented by the formula ((4c) wherein $R^{10}$ is methyl or ethyl.

The bisazo compound represented by the formula (1) and a salt thereof can be produced, for example, in the following manner.

An example of the method for producing the bisazo compound represented by the formula (1) wherein $X^1$ and $X^2$ are chloro or fluoro and a salt thereof:

A compound, the free acid form of which is represented by the following formula (7):

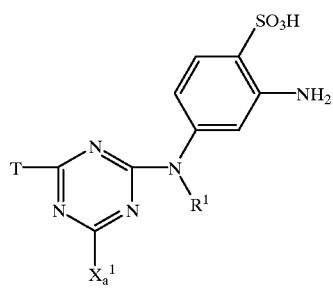

(7)

wherein $R^1$ and T have the same meaning as above and $X^1a$ represents fluoro or chloro, is obtained by condensing a compound represented by the following formula (5):

 H—T (5)

wherein T has the same meaning as above, and a diamine compound, the free acid form of which is represented by the following formula (6)

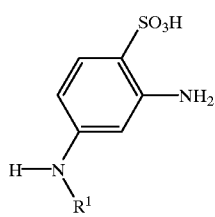

(6)

wherein $R^1$ has the same meaning as above, with 2,4,6-trihalogeno-s-triazine according to the conventional method.

Separately, a compound, the free acid form of which is represented by the following formula (10):

(10)

wherein $R^2$ and U have the same meaning as above, and $X^2a$ represents fluoro or chloro, is obtained by condensing a compound represented by the following formula (8):

H—U (8)

wherein U has the same meaning as above, and a diamine compound, the free acid form of which is represented by the following formula (9):

(9)

wherein $R^2$ has the same meaning as above, with 2,4,6-trihalogeno-s-triazine according to the conventional method.

Then, the amine compounds of formulae (7) and (10) are diazotized, respectively, according to the conventional method to obtain diazotized compounds.

A compound, the free acid form of which is represented by the following formula (12):

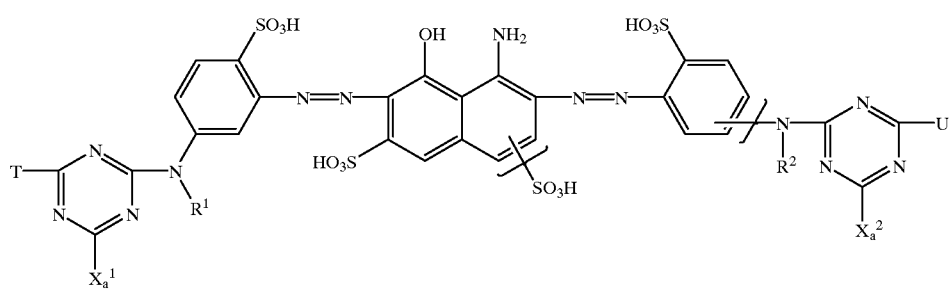

(12)

wherein $R^1$, $R^2$, T and U have the same meaning as above, and $X^1a$ and $X^2a$ represent fluoro or chloro, is obtained by coupling the diazotized product obtained from the amine compounds of formula (10) with a 1-amino-8-naphtol compound, the free acid form of which is represented by the following formula (11):

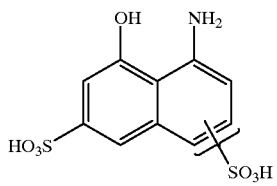

(11)

at a temperature of −10° C. to 30° C. while controlling pH between 0 and 4, and then coupling the obtained product of the coupling reaction with the diazotized product obtained from the amine compounds of formula (7) at a temperature of 0° C. to 40° C. while controlling pH between 2 and 8.

Alternatively, the bisazo compound, the free acid form of which is represented by the general formula (1), is produced by the following manner:

A compound, the free acid form of which is represented by the following formula (13):

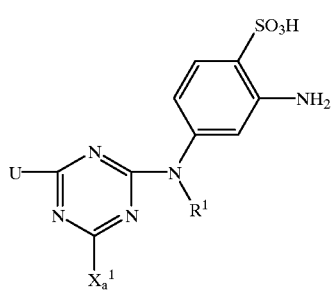

(13)

wherein $R^1$ and U have the same meaning as above, and $X^1a$ represents fluoro or chloro, is obtained by condensing the compound, the free acid formes of which are represented by above formulae (6) and the compound represented by the formula (8), with 2,4,6-trihalogeno-s-triazine according to the conventional method.

Separately, a compound, the free acid form of which is represented by the following formula (14):

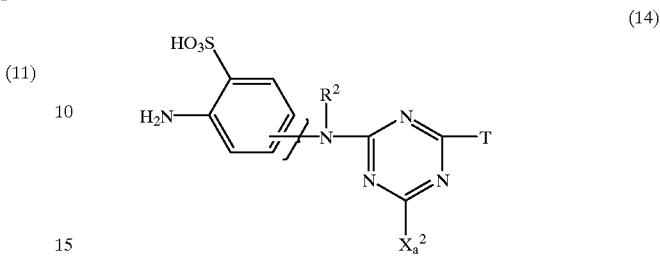

(14)

wherein $R^2$ and T have the same meaning as above, and $X^2a$ represents fluoro or chloro, is obtained by condensing the amine compounds of the general formulae (5) and (9) with 2,4,6-trihalogeno-s-triazine, respectively, according to the conventional method.

Then, the amine compounds of formulae (13) and (14) are diazotized, respectively, according to the conventional method to obtain diazotized compounds.

A compound, the free acid form of which is represented by the following formula (15):

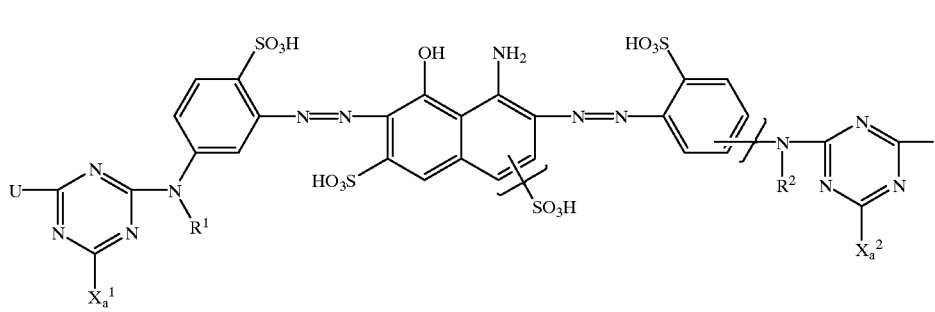

(15)

wherein $R^1$, $R^2$, U and T have the same meaning as above, and $X^1a$ and $X^2a$ represent fluoro or chloro, is obtained by coupling the diazotized product obtained from the amine compounds of formula (14) with a 1-amino-8-naphtol compound, the free acid form of which is represented by the formula (11) at a temperature of −10° C. to 30° C. while controlling pH between 0 and 4, and then coupling the obtained product of the coupling reaction with the diazotized product obtained from the amine compounds of formula (13) at a temperature of 0° C. to 40° C. while controlling pH between 2 and 8.

Furthermore, the bisazo compound of the formula (1) wherein $X^1$ and $X^2$ represent pyridinio which may be optionally substituted, can be obtained, for example, according to the following manner:

The compound, the free acid form of which is represented by the formula (12), is obtained according to a method similar to that described above.

Then, a compound of the following formula (16):

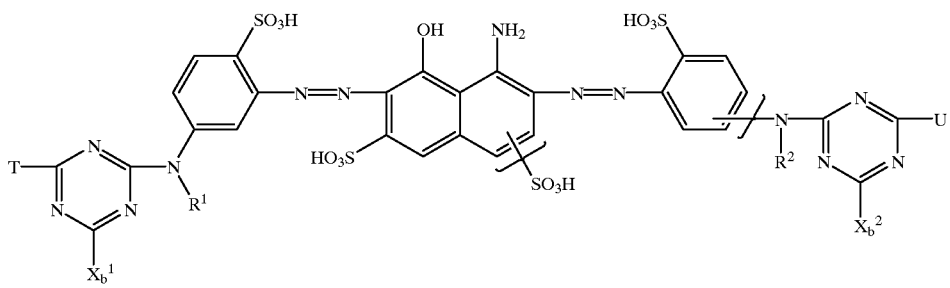

(16)

wherein $R^1$, $R^2$, U and T have the same meaning as above, and $X^1b$ and $X^2b$ represent pyridinio which may be optionally substituted, can be obtained by reacting the compound of the formula (12) with the corresponding pyridine compound under conditions including a temperature of 10° C. to 100° C. and a pH between 2 and 9.

In the above manners for producing the bisazo compound of the formula (1), three kinds of compounds are condensed with 2,4,6-trihalogeno-s-triazine ring. The order for the condensation reactions with 2,4,6-trihalogeno-s-triazine is not particularly limited. In addition, the conditions for such condensation reactions are not particularly limited. Usually, the first condensation reaction, i.e. the reaction with unsubstituted triazine, is conducted at a temperature of −10° C. to 40° C. and a pH of 1 to 10 for; and the second condensation reaction, i.e. the reaction with monosubstituted triazine, is conducted at a temperature of 0° C. to 70° C. and a pH of 2 to 10.

For obtaining the bisazo compound of the formula (1) wherein groups represented by $Y^1$ and $Y^2$ in the above formulae (3a) and (3b) are —$CH_2CH_2L$, and L is an ester, such as a sulfate ester or a phosphate ester, said ester group can be formed after the condensation reaction is completed.

The raw material, 2,4,6-trihalogeno-s-triazine, is preferably cyanuryl chloride or cyanuryl fluoride.

The 1-amino-8-naphthol compound represented by the above formula (10) is preferably H acid or K acid, with H acid being particularly preferred.

The above explained bisazo compounds represented by the formula (1) and a salt thereof can be used, for example, as reactive dyes for dyeing or printing onto a fiber material. The fiber material is not particularly limited as far as it has a hydroxyl and/or a carbonamido group. Examples thereof include natural or regenerated cellulose fibers, natural or synthesized polyamide fibers, polyurethane fibers, leathers and mixed materials containing them.

The natural cellulose fibers specifically include cotton, linen, flax, jute, ramie and the like. Preferred one is cotton.

The regenerated cellulose fibers specifically include rayon, polynosic, cupra and products commercialized under the names "Tencel", "Tufcel", "Modal", "Celtima" and the like.

The natural or synthetic polyamide fibers specifically include wool, other animal hair, silk, polyamide-6,6, polyamide-6, polyamide-11, polyamide-4 and the like.

The mixed materials containing them include textile blend of these fiber materials and textile blend of the fiber material with a synthetic fiber such as polyester, acryl fiber and the like.

The bisazo compound and a salt thereof of the present invention can be used for dyeing or printing onto the above described materials, particularly the above described fiber materials, by a method depending on their physical or chemical properties.

Such method specifically include a method for dyeing or printing onto the above described fibers by the exhaustion dyeing method, the cold batch-up method, the continuous dyeing method, the printing method or the like.

For example, when a cellulose fiber is dyed by the exhaustion dyeing method, the method include dyeing at a temperature of about 30 to 100° C. in the presence of an acid-binding agent such as sodium carbonate, sodium bicarbonate, trisodium phosphate, sodium hydroxide or the like and, if necessary, adding a neutral salt such as sodium sulfate, sodium chloride or the like and, if further required, using a solubilizing agent, penetration agent, leveling agent or the like. The addition of the acid-binding agent, neutral salt and the like can be carried out in one portion or in divided portions according to the routine method.

When a cellulose fiber is dyed by the cold batch-up method, the method include padding using a neutral salt such as sodium sulfate, sodium chloride or the like and an acid-binding agent such as sodium hydroxide, sodium silicate or the like and then standing in a sealed packing material at a determined temperature.

When a cellulose fiber is dyed by the continuous dyeing method, examples of the method include the one-phase padding method in which the fiber is padded according to a known process at room temperature or an elevated temperature in the presence of an acid-binding agent such as sodium carbonate, sodium bicarbonate or the like and then treated by steaming or dry-heating. Also included is the two-phase padding method in which the fiber is dipped in a padding solution containing a compound of the present invention dissolved therein, padded with a neutral salt such as sodium sulfate, sodium chloride or the like and an acid-binding agent such as sodium hydroxide, sodium silicate or the like and then treated by steaming or dry-heating.

When a cellulose fiber is printed, examples of the method include a method in which the fiber is printed, in the one-phase process, with a printing paste containing an acid-binding agent such as sodium bicarbonate or the like and then steamed at a high temperature over 80° C. Also included a method in which the fiber is printed, in the two-phase process, with, for example, a neutral or weakly acidic printing paste, passed through an alkaline bath containing an electrolyte or over-padded with an alkaline padding solution containing an electrolyte, and then treated by steaming or dry-heating. The printing paste used here may contain, for example, a size and/or emulsifier such as sodium alginate, starch ether or the like, and if necessary, may further contain, for example, a printing aid and/or dispersing agent such as urea or the like.

When a cellulose fiber is dyed or printed with the compound of the present invention, the acid-binding agent to be used is not particularly limited. Examples include alkali metal hydroxides, water-soluble basic salts formed by an alkali metal or alkaline earth metal with an inorganic or organic acid, compounds which release an alkali in a heated state and the like. Particularly mentioned are alkali metal hydroxides and alkali metal salts with an inorganic or organic acid of weak or medium strength. Among them, sodium or potassium hydroxide and sodium or potassium salts are preferred. As the acid-binding agent, in addition to the above described sodium carbonate, sodium bicarbonate, trisodium phosphate, sodium hydroxide and sodium silicate, potassium hydroxide, sodium formate, potassium carbonate, mono- or di-sodium phosphate, sodium trichloroacetate and the like can specifically be used.

When a synthetic or natural polyamide fiber or a polyurethane fiber is dyed by the exhaustion dyeing method, the compound of the present invention is exhausted into the fiber in an acidic or weakly acidic dyeing bath while controlling pH, which is then changed to neutral or alkaline nature. If necessary, a leveling agent such as a condensation product of cyanuryl chloride with aminobenzenesulfonic acid, a condensation product of cyanuryl chloride with aminonaphthalenesulfonic acid, an addition product of stearylamine with ethyleneoxide or the like, or other agent may be used.

The compound of the present invention exhibits an excellent dyeing reproducibility and dyeing performances such as leveling property and washing-off property, and high build-up property and effective dyeing rate, in dyeing and printing onto fiber materials, particularly in dyeing and printing onto cellulose fibers. It also has an advantage of dyeing ability at a lower salt concentration The dyed product and printed product obtained with these compounds are good in various fastness such as good chlorine fastness, light fastness, perspiration fastness, perspiration-sunlight fastness, acid-hydrolysis fastness, alkali fastness, washing fastness and peroxide washing fastness.

The bisazo compound and a salt thereof of the present invention can be used, if necessary, in admixture with another dye insofar as the feature of the invention is adversely affected, in order to obtain a desired color tone. The dye usable in admixture is not particularly limited as far as it is a reactive dye. Examples include dyes having, as the reactive group, at least single group from at least one selected from sulfatoethylsulfone group, vinylsulfone group, monochlorotriazine group, monofluorotriazine group, mononicotinatetriadine group, dichlorotriazine group, difluoromonochloropyrimidine group and trichlorotriazine group, or dyes commercialized under group names of Sumifix, Sumifix Supra, Sumifix HF, Remazol, Levafix, Procion, Cibacron, Basilen, Drimarene, Kayacion, Kayacelon React and the like, dyes disclosedin JP-A-50-178, JP-A-56-9483, JP-A-56-15481, JP-A-56-118976, JP-A-56-128380, JP-A-57-2365, JP-A-57-89679, JP-A-57-143360, JP-A-59-15451, JP-A-58-191755, JP-A-59-96174, JP-A-59-161463, JP-A-60-6754, JP-A-60-123559, JP-A-60-229957, JP-A-60-260654, JP-A-61-126175, JP-A-61-155469, JP-A-61-225256, JP-A-63-77974, JP-A-63-225664, JP-A-1-185370, JP-A-3-770, JP-A-5-32907, JP-A-5-117538, JP-A-5-247366 and JP-A-6-287463, dyes represented by C. I. Reactive Blue. 19 and C. I. Reactive Black 5.

The bisazo compound including salts thereof according the present invention are useful as reactive dyes and they are excellent in dyeing performance, for example, build-up property, leveling property and the like. In addition, according to the process of the present invention, dyed products and printed products of dark-blue color which are excellent in various fastness can be obtained with good reproducibility.

EXAMPLES

The present invention will now be described in more detail with reference of Examples, which should not be construed as a limitation upon the scope of the invention. In Examples, part(s) means part(s) by weight.

Example 1

A compound, the free acid form of which is represented by the following formula (17):

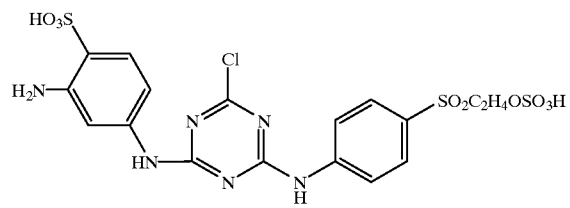

(17)

, was obtained by condensing 3.69 parts of cyanuryl chloride and 5.63 parts of 1-aminobenzene-3-β-sulfatoethylsulfone in an aqueous medium at a pH of 2 to 6 at a temperature of −5° C. to +20° C., and then condensing the product with 3.76 parts of 2,4-diaminobenzenesulfonic acid at a pH of 3 to 7 at a temperature of 10° C. to 40° C., according to the conventional method.

Then, a compound, the free acid form of which is represented by the following formula (18):

(18)

was obtained by condensing 3.69 parts of cyanuryl chloride and 3.76 parts of 2,4-diaminobenzenesulfonic acid at a pH of 1 to 4 at a temperature of −10° C. to +20° C., and then condensing the resulting product with 2.42 parts of 2-ethyl aniline at a pH of 2.5 to 7 at a temperature of 0° C. to 30° C., according to the conventional method.

The compound of the above formula (17) was diazotized according to the conventional method, then coupling with 6.39 parts of 1-amino-8-hydroxynaphthalene-3,6-disulfonic acid at a pH of 1 to 3.5 and a temperature of 0° C. to 30° C. to obtained a coupled compound.

A bisazo compound (λmax: 606 nm, aqueous medium), the free acid form of which is represented by the following formula (19):

(19)

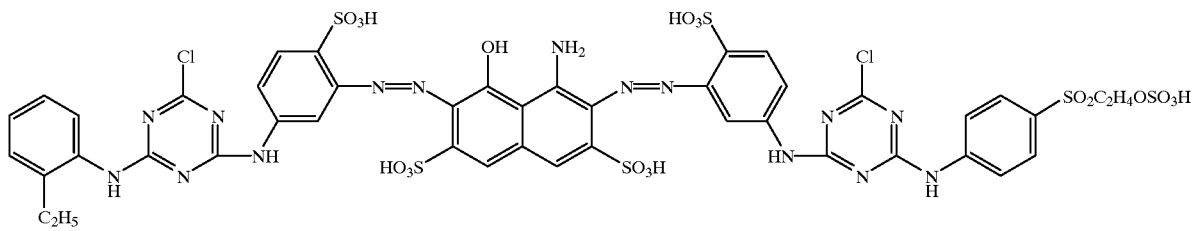

was obtained by coupling, at a pH of 4 to 8 and a temperature of 0° C. to 30° C., the obtained coupled compound with a compound which was obtained by diazotizing the compound of the above formula (18) according to a conventional method followed by salting out or evaporating and drying according to the conventional method.

Example 2

A compound, the free acid form of which is represented by the formula (17) was obtained by condensing 3.69 parts of cyanuryl chloride and 5.63 parts of 1-aminobenzene-3-β-sulfatoethylsulfone in an aqueous medium at a pH of 2 to 6 at a temperature of −5° C. to +20° C., and then condensing the product with 3.76 parts of 2,4-diaminobenzenesulfonic acid at a pH of 3 to 7 at a temperature of 10° C. to 40° C., according to the conventional method.

Then, a compound, the free acid form of which is represented by the following formula (20):

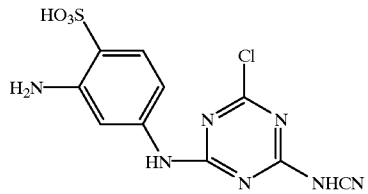

(20)

was obtained by condensing 3.69 parts of cyanuryl chloride and 3.76 parts of 2,4-diaminobenzenesulfonic acid at a pH of 1 to 4 at a temperature of −10° C. to +20° C., and then condensing the resulting product with 0.84 parts of cyanamide at a pH of 8 to 11 at a temperature of 20° C. to 60° C., according to the conventional method.

The compound of the above formula (17) was diazotized according to the conventional method, then coupling with 6.39 parts of 1-amino-8-hydroxynaphthalene-3,6-disulfonic acid at a pH of 1 to 3.5 and a temperature of 0° C. to 30° C. to obtained a coupled compound.

A bisazo compound (λmax: 606 nm, aqueous medium), the free acid form of which is represented by the following formula (21):

(21)

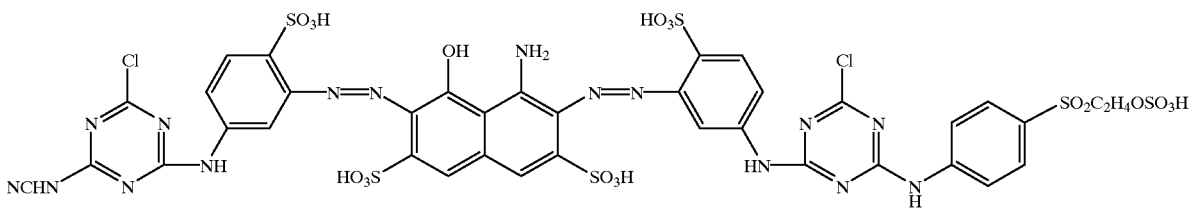

was obtained by coupling, at a pH of 4 to 8 and a temperature of 0° C. to 30° C., the obtained coupled compound with a compound which was obtained by diazotizing the compound of the above formula (20) according to a conventional method followed by salting out or evaporating and drying according to the conventional method.

Example 3

A compound, the free acid form of which is represented by the formula (17) was obtained by condensing 3.69 parts of cyanuryl chloride and 5.63 parts of 1-aminobenzene-3-β-sulfatoethylsulfone in an aqueous medium at a pH of 2 to 6 at a temperature of −5° C. to +20° C., and then condensing the product with 3.76 parts of 2,4-diaminobenzenesulfonic acid at a pH of 3 to 7 at a temperature of 10° C. to 40° C., according to the conventional method.

Then, a compound, the free acid form of which is represented by the following formula (22):

(22)

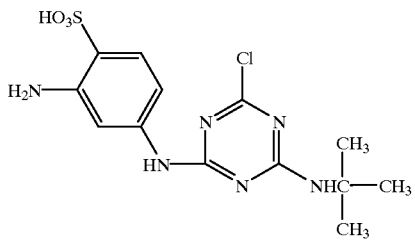

was obtained by condensing 3.69 parts of cyanuryl chloride and 3.76 parts of 2,4-diaminobenzenesulfonic acid at a pH of 1 to 4 at a temperature of −10° C. to +20° C., and then condensing the resulting product with 1.46 parts of tert-butylamine at a pH of 7 to 11 at a temperature of 20° C. to 60° C., according to the conventional method.

The compound of the above formula (17) was diazotized according to the conventional method, then coupling with 6.39 parts of 1-amino-8-hydroxynaphthalene-3,6-disulfonic acid at a pH of 1 to 3.5 and a temperature of 0° C. to 30° C. to obtained a coupled compound.

A bisazo compound (λmax: 608 nm, aqueous medium), the free acid form of which is represented by the following formula (23):

was obtained by coupling, at a pH of 4 to 8 and a temperature of 0° C. to 30° C., the obtained coupled compound with a compound which was obtained by diazotizing the compound of the above formula (22) according to a conventional methodfollowed by salting out or evaporating and drying according to the conventional method.

Example 4

Corresponding bisazo compounds, respectively, are obtained by carrying out the same syntheses to that in Example 1, except for using compounds in column 2 in the following Tables 1 to 8 in place of the compound of the formula (17), compounds in column 3 in the same Tables in place of 1-amino-8-hydroxynaphthalene-3,6-disulfonic acid, and compounds in column 4 in the same Tables in place of the compound of the formula (18).

(23)

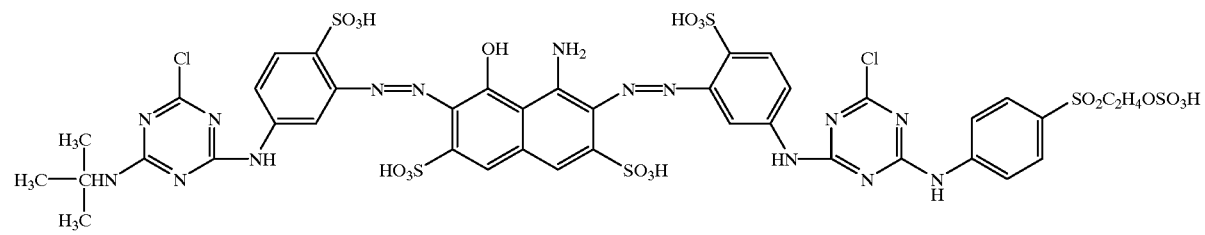

TABLE 1

| Column 1 | Column 2 | Column 3 | Column 4 |
| --- | --- | --- | --- |
| 1 | | | |
| 2 | | | |
| 3 | | | |

TABLE 1-continued

| Column 1 | Column 2 | Column 3 | Column 4 |
|---|---|---|---|
| 4 | (structure: 4-sulfo-3-aminophenyl-NH-triazine with OCH$_3$ and Cl substituents) | 1-amino-8-hydroxynaphthalene-3,6-disulfonic acid (H-acid) | (structure: triazine with Cl, NH-phenyl-SO$_2$C$_2$H$_4$OSO$_3$H, and NH-(4-sulfo-3-aminophenyl)) |
| 5 | (structure: 4-sulfo-3-aminophenyl-NH-triazine with N(CH$_3$)C$_2$H$_4$OH and Cl substituents) | 1-amino-8-hydroxynaphthalene-3,6-disulfonic acid (H-acid) | (structure: triazine with Cl, NH-phenyl-SO$_2$C$_2$H$_4$OSO$_3$H, and NH-(4-sulfo-3-aminophenyl)) |

TABLE 2

| Column 1 | Column 2 | Column 3 | Column 4 |
|---|---|---|---|
| 6 | (structure) | (structure) | (structure) |
| 7 | (structure) | (structure) | (structure) |
| 8 | (structure) | (structure) | (structure) |

TABLE 2-continued

| Column 1 | Column 2 | Column 3 | Column 4 |
| --- | --- | --- | --- |
| 9 | (structure: 4-sulfo-3-aminophenyl-NH-triazine with Cl and O-phenyl substituents) | 1-amino-8-hydroxynaphthalene-3,6-disulfonic acid | (structure: triazine with Cl, bearing NH-phenyl-SO$_2$C$_2$H$_4$OSO$_3$H and NH-(4-amino-3-sulfophenyl)) |
| 10 | (structure: 4-sulfo-3-aminophenyl-NH-triazine with F and NHC$_2$H$_4$OH substituents) | 1-amino-8-hydroxynaphthalene-3,6-disulfonic acid | (structure: triazine with F, bearing NH-phenyl-SO$_2$C$_2$H$_4$OSO$_3$H and NH-(4-amino-3-sulfophenyl)) |

TABLE 3

| Column 1 | Column 2 | Column 3 | Column 4 |
|---|---|---|---|
| 11 | | | |
| 12 | | | |
| 13 | | | |

TABLE 3-continued

| Column 1 | Column 2 | Column 3 | Column 4 |
|---|---|---|---|
| 14 | 2-(2-hydroxyethylamino)-4-chloro-6-(4-sulfo-3-aminophenylamino)-1,3,5-triazine | 1-amino-8-hydroxynaphthalene-3,6-disulfonic acid | 2-chloro-4-(4-(β-sulfatoethylsulfonyl)phenylamino)-6-(4-sulfo-3-aminophenylamino)-1,3,5-triazine |
| 15 | 2-(N-(2-hydroxyethyl)amino)-4-chloro-6-(4-sulfo-3-aminophenylamino)-1,3,5-triazine | 1-amino-8-hydroxynaphthalene-3,6-disulfonic acid | 2-chloro-4-(4-(β-sulfatoethylsulfonyl)phenylamino)-6-(4-sulfo-3-aminophenylamino)-1,3,5-triazine |

TABLE 4

| Column 1 | Column 2 | Column 3 | Column 4 |
| --- | --- | --- | --- |
| 16 | | | |
| 17 | | | |
| 18 | | | |

TABLE 4-continued

| Column 1 | Column 2 | Column 3 | Column 4 |
| --- | --- | --- | --- |
| 19 | (structure) | (structure) | (structure) |
| 20 | (structure) | (structure) | (structure) |

TABLE 5

| Column 1 | Column 2 | Column 3 | Column 4 |
| --- | --- | --- | --- |
| 21 | | | |
| 22 | | | |
| 23 | | | |

TABLE 5-continued

| Column 1 | Column 2 | Column 3 | Column 4 |
|---|---|---|---|
| 24 | (structure) | (structure) | (structure) |
| 25 | (structure) | (structure) | (structure) |

TABLE 6
| Column 1 | Column 2 | Column 3 | Column 4 |
|---|---|---|---|
| 26 | 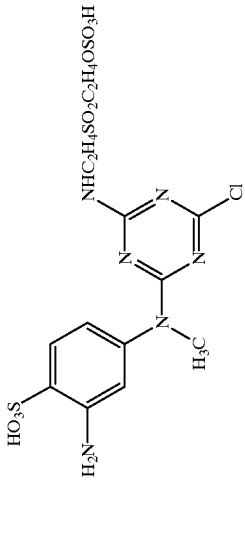 | 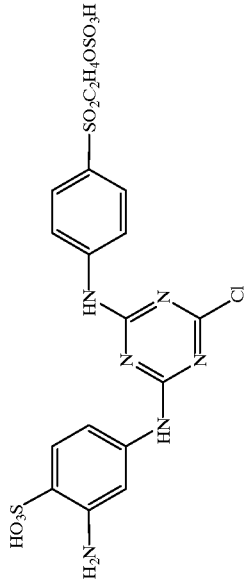 | 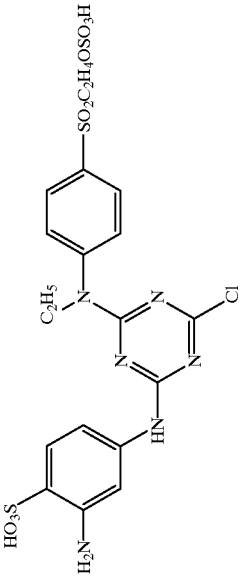 |
| 27 | 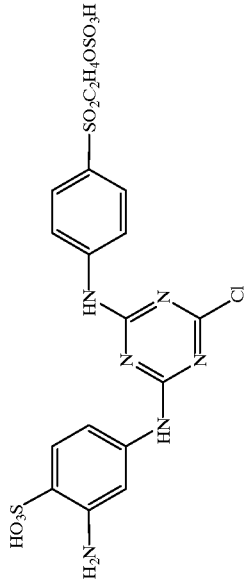 | 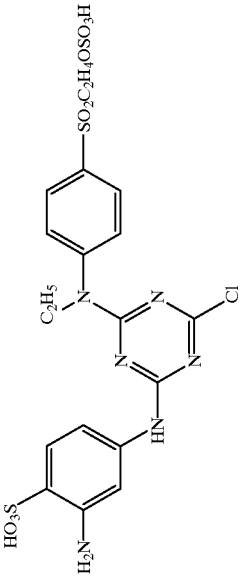 | 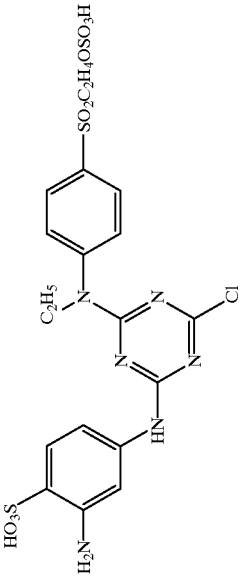 |
| 28 | 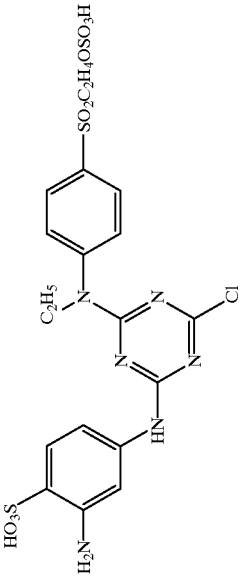 | 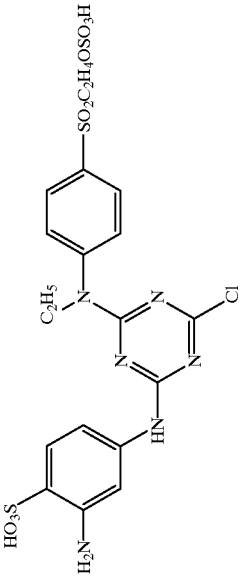 | |

TABLE 6-continued

| Column 1 | Column 2 | Column 3 | Column 4 |
|---|---|---|---|
| 29 | (structure) | (structure) | (structure) |
| 30 | (structure) | (structure) | (structure) |

TABLE 7

| Column 1 | Column 2 | Column 3 | Column 4 |
|---|---|---|---|
| 31 | (structure) | (structure) | (structure) |
| 32 | (structure) | (structure) | (structure) |
| 33 | (structure) | (structure) | (structure) |

TABLE 7-continued

| Column 1 | Column 2 | Column 3 | Column 4 |
|---|---|---|---|
| 34 | chloro-triazine with NH-linked 3-amino-4-sulfophenyl and NH-linked CH(C₂H₄)(CH₂OCH₃) group | 4-amino-5-hydroxynaphthalene-2,7-disulfonic acid | chloro-triazine with NH-linked 3-amino-4-sulfophenyl and NH-linked 4-(SO₂C₂H₄OSO₃H)phenyl |
| 35 | chloro-triazine with NH-linked 3-amino-4-sulfophenyl and NH-linked C(CH₃OH)(CH₂OH)(CH₂OH) group | 4-amino-5-hydroxynaphthalene-2,7-disulfonic acid | chloro-triazine with NH-linked 3-amino-4-sulfophenyl and NH-linked 4-(SO₂C₂H₄OSO₃H)phenyl |

TABLE 8

| Column 1 | Column 2 | Column 3 | Column 4 |
|---|---|---|---|
| 36 | | | |
| 37 | | | |
| 38 | | | |

TABLE 8-continued

| Column 1 | Column 2 | Column 3 | Column 4 |
| --- | --- | --- | --- |
| 39 | chlorotriazine with NH-phenyl(SO$_3$H)(NH$_2$) and NH-C(CH$_3$)$_3$ substituents | 4-amino-5-hydroxynaphthalene-2,7-disulfonic acid | chlorotriazine with NHC$_2$H$_4$SO$_2$C$_2$H$_4$OSO$_3$H and NH-phenyl(SO$_3$H)(NH$_2$) substituents |
| 40 | chlorotriazine with NH-phenyl(SO$_3$H)(NH$_2$) and NHCN substituents | 4-amino-5-hydroxynaphthalene-2,7-disulfonic acid | chlorotriazine with NHC$_2$H$_4$SO$_2$C$_2$H$_4$OSO$_3$H and NH-phenyl(SO$_3$H)(NH$_2$) substituents |

Example 5

A bisazo compound, the free of which is represented by the following formula (24):

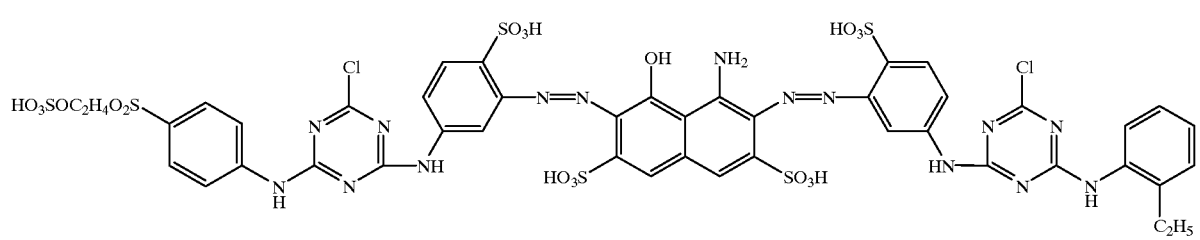

(24)

can be obtained by synthesizing the compounds of the formulae (17) and (18), diazotizing the compound of the formula (18) according to the conventional method, then coupling with 6.39 parts of 1-amino-8-hydroxynaphthalene-3,6-disulfonic acid at a pH of 1 to 3.5 and a temperature of 0° C. to 30° C., subsequently coupling, at a pH of 4 to 8 and a temperature of 0° C. to 30° C., with a diazo compound obtained by diazotizing the compound of the above formula (17) according to a conventional method, and salting out or evaporating and drying the obtained product according to the conventional method.

Example 6

Corresponding bisazo compounds, respectively, are obtained by carrying out the same syntheses to that in Example 3, except for using compounds in column 2 in the following Tables 9 to 14 in place of the compound of the formula (17), compounds in column 3 in the same Tables in place of 1-amino-8-hydroxynaphthalene-3,6-disulfonic acid, and compounds in column 4 in the same Tables in place of the compound of the formula (18).

TABLE 9

| Column 1 | Column 2 | Column 3 | Column 4 |
|---|---|---|---|
| 1 | | | |
| 2 | | | |
| 3 | | | |

TABLE 9-continued

| Column 1 | Column 2 | Column 3 | Column 4 |
|---|---|---|---|
| 4 | | | |
| 5 | | | |

TABLE 10

| Column 1 | Column 2 | Column 3 | Column 4 |
|---|---|---|---|
| 6 | | | |
| 7 | | | |
| 8 | | | |

TABLE 10-continued

| Column 1 | Column 2 | Column 3 | Column 4 |
| --- | --- | --- | --- |
| 9 | (structure) | (structure) | (structure) |
| 10 | (structure) | (structure) | (structure) |

TABLE 11
| Column 1 | Column 2 | Column 3 | Column 4 |
|---|---|---|---|
| 11 | 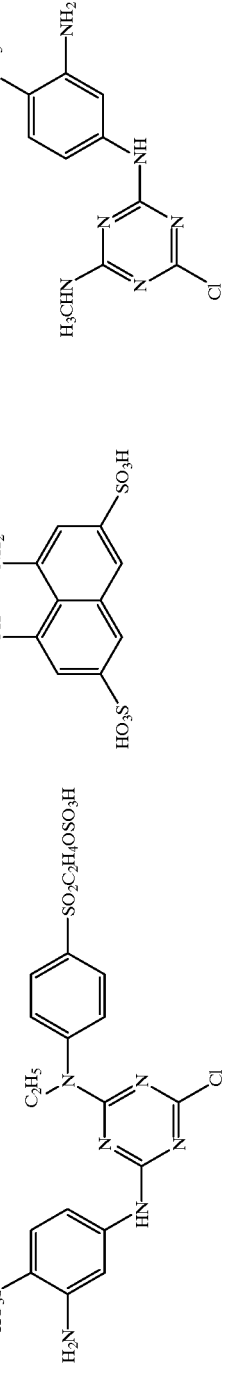 | 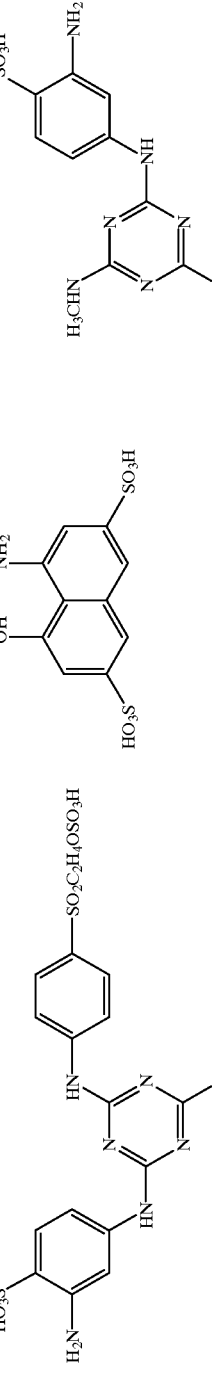 | 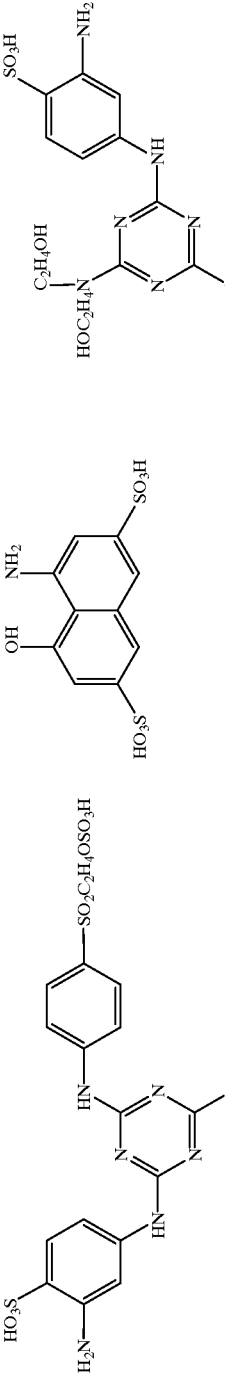 |
| 12 | 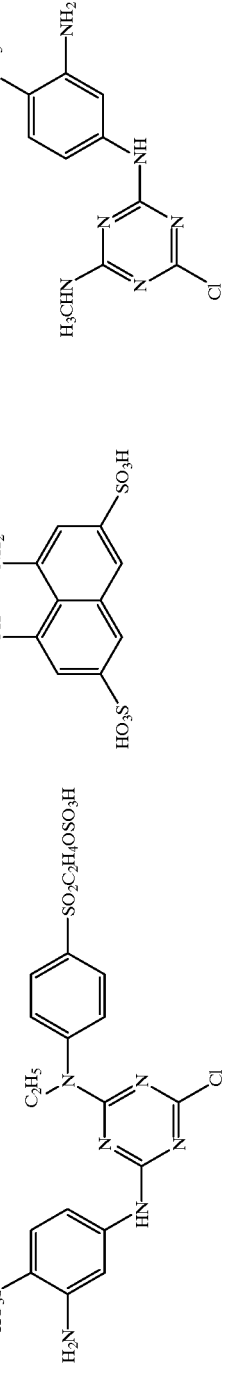 | 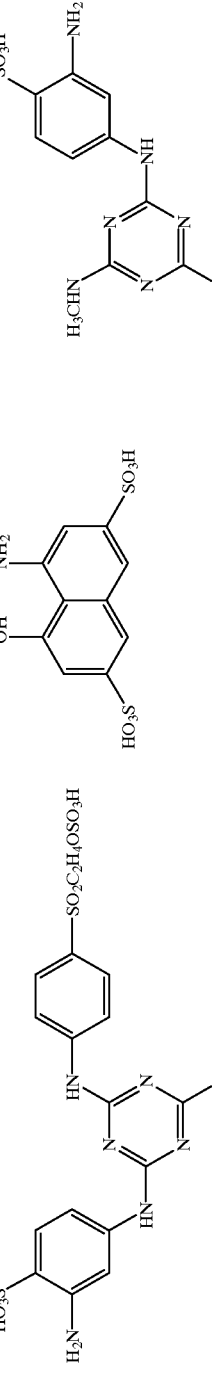 | 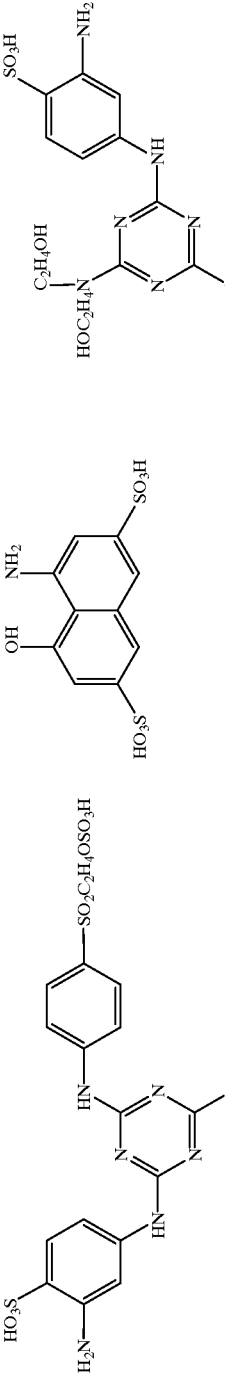 |
| 13 | 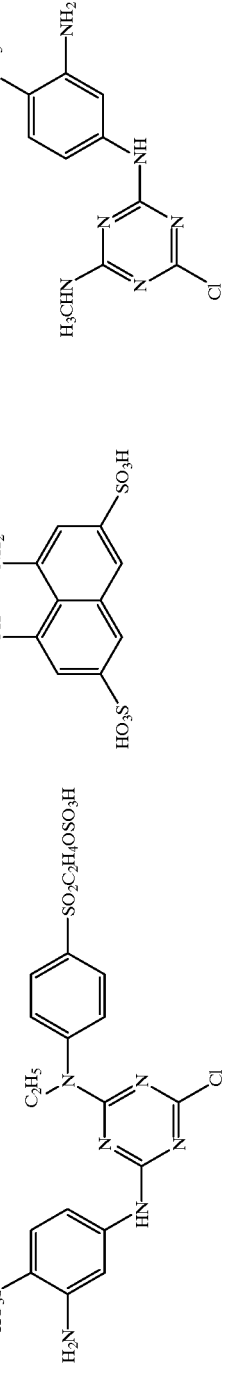 | 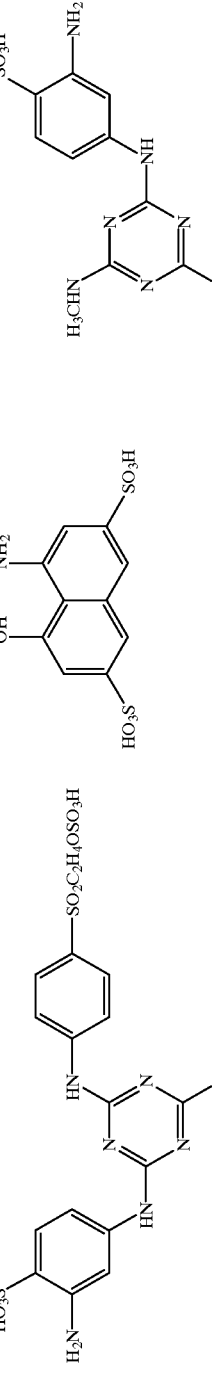 | 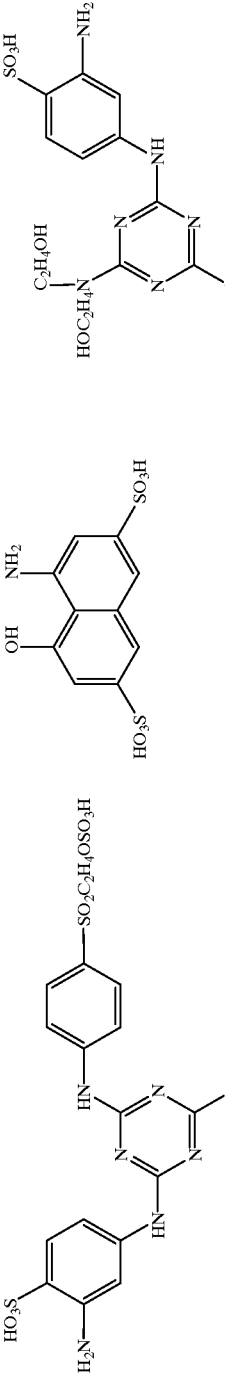 |

TABLE 11-continued

| Column 1 | Column 2 | Column 3 | Column 4 |
|---|---|---|---|
| 14 | | | |
| 15 | | | |

TABLE 12

| Column 1 | Column 2 | Column 3 | Column 4 |
|---|---|---|---|
| 16 | | | |
| 17 | | | |
| 18 | | | |

TABLE 12-continued

| Column 1 | Column 2 | Column 3 | Column 4 |
| --- | --- | --- | --- |
| 19 | | | |
| 20 | | | |

TABLE 13

| Column 1 | Column 2 | Column 3 | Column 4 |
|---|---|---|---|
| 21 | | | |
| 22 | | | |
| 23 | | | |

TABLE 13-continued

| Column 1 | Column 2 | Column 3 | Column 4 |
|---|---|---|---|
| 24 | | | |
| 25 | | | |

TABLE 14

| Column 1 | Column 2 | Column 3 | Column 4 |
|---|---|---|---|
| 26 | | | |
| 27 | | | |
| 28 | | | |

TABLE 14-continued

| Column 1 | Column 2 | Column 3 | Column 4 |
|---|---|---|---|
| 29 | (structure) | (structure) | (structure) |
| 30 | (structure) | (structure) | (structure) |

Example 7

A bisazo compound, the free of which is represented by the following formula (25):

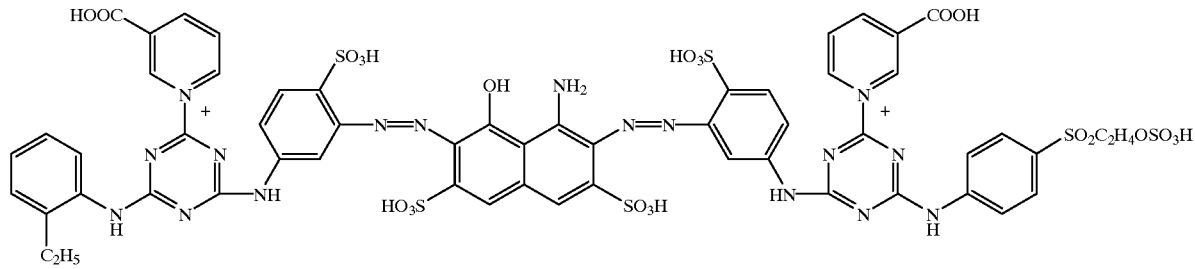

(25)

can be obtained by synthesizing the compound of the formula (19) according to the same manner as in Example 1, condensing the compound of the formula (19) with 4.92 parts of 3-carboxypirizine at a pH of 2 to 4 at a temperature of 40° C. to 100° C., and then salting out or evaporating and drying the obtained product.

Example 8

Corresponding bisazo compounds, respectively, are obtained by carrying out the same syntheses to that in Example 7, except for using compounds in column 2 in the following Tables 15 to 17 in place of the compound of the formula (19), and compounds in column 3 in the same Tables in place of 3-carboxypirizine.

TABLE 15

| Column 1 | Column 2 | Column 3 |
|---|---|---|
| 1 | | |
| 2 | | |
| 3 | | |

TABLE 15-continued

TABLE 16

TABLE 16-continued
| Column 1 | Column 2 | Column 3 |
|---|---|---|
| 9 | 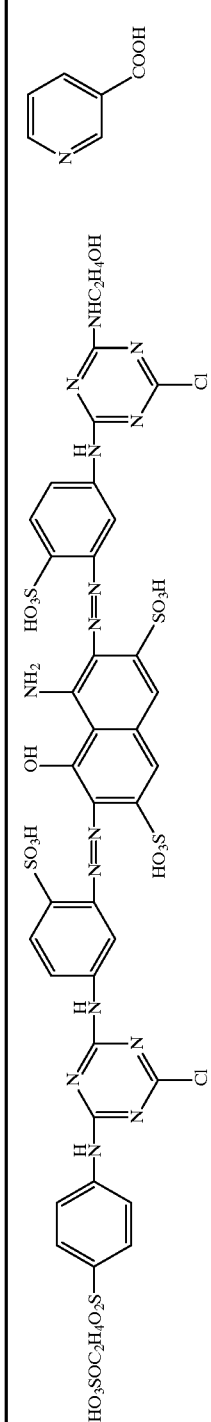 | 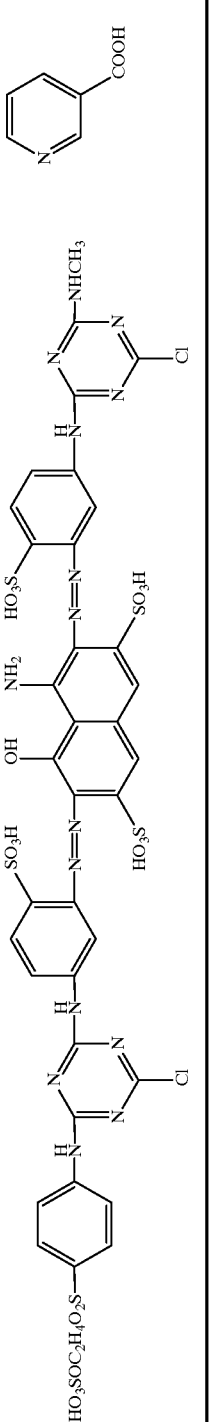 |
| 10 | 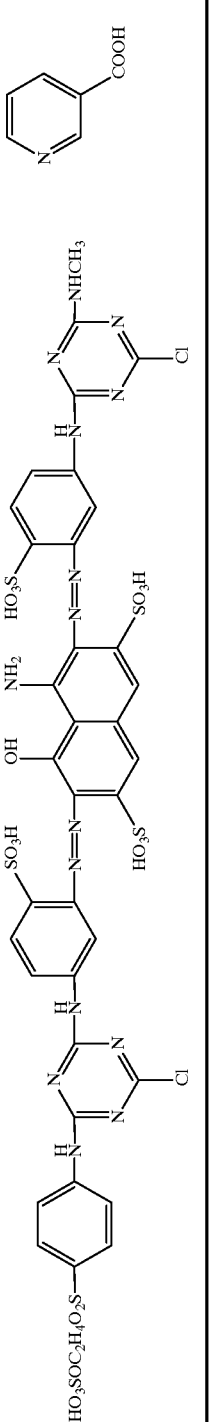 | 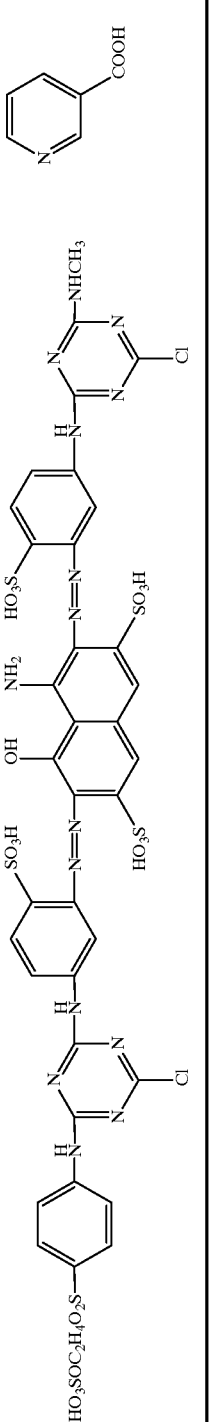 |

Dyeing Example 1

Into 200 parts of water was dissolved 0.3 part of the compound obtained in Example 1, 2 or 3, and 20 parts of sodium sulfate was added to the solution. Then, 10 parts of cotton was added thereto, and the temperature was raised to 60° C. After 30 minutes from the time when the temperature reached to 60° C., 4 parts of sodium carbonate was added and dyeing was carried out for 1 hour at the same temperature. Then, washing with water and soaping were performed. Washing-off during washing with water and soaping was good. Coloring of wastewater from dyeing was little. The obtained dyed products had an even deep blue color. The obtained dyed products were good in various fastness including chlorine fastness, light fastness, perspiration fastness, perspiration-sunligt fastness, acid hydrolysis fastness, alkali fastness, washing fastness and peroxide washing fastness.

Dyeing Example 2

The dyeing in Dyeing example 1 is repeated except that the amount of sodium sulfate is changed from 20 parts to 10 parts. The obtained dyed products have a comparative quality to those of the dyed products obtained in Dyeing example 1.

Dyeing Example 3

The dyeing in Dyeing example 1 is repeated except that the amount of sodium sulfate is changed from 20 parts to 4 parts. The obtained dyed products have a comparative quality to those of the dyed products obtained in Dyeing example 1.

Dyeing Example 4

The dyeing in Dyeing examples 1 to 3 are repeated except that the temperature is changed from 60° C. to 70° C. The obtained dyed products have a comparative quality to those of the dyed products obtained in Dyeing examples 1 to 3.

Dyeing Example 5

The dyeing in Dyeing examples 1 to 3 are repeated except that the temperature is changed from 60° C. to 80° C. The obtained dyed products have a comparative quality to those of the dyed products obtained in Dyeing examples 1 to 3.

Dyeing Example 6

Each of the dyeing in Dyeing examples 1 to 5 is repeated except that 0.06 part of sodium salt of a condensation product (degree of sulfonation: 110%, average degree of polymerization: 1.8) of methylnaphthalenesulfonic acid and formaldehyde is used in addition to 0.3 parts of the bisazo compound. The obtained dyed products have a comparative quality to those of the dyed products obtained in Dyeing examples 1 to 5.

Printing Example 1

Color pastes having the following compositions are prepared using respective compounds obtained in Examples 1 to 8.

| Composition of color paste: | |
|---|---|
| Bisazo compound | 5 parts |
| Urea | 5 parts |
| Sodium alginate (5%) stock paste | 50 parts |
| Hot water | 25 parts |
| Sodium bicarbonate | 2 parts |
| Balance (water) | 13 parts |
| Total | 100 parts |

The color pastes are printed onto a cotton broad cloth treated for mercerization. The printed cloth is intermediately dried, steamed at 100° C. for 5 minutes, washed with hot water, soaped, washed again with hot water and finished by drying. The obtained dyed products respectively have an even deep blue color and are good in various fastness including chlorine fastness, light fastness, perspiration fastness, perspiration-sunligt fastness, acid hydrolysis fastness, alkali fastness, washing fastness and peroxide washing fastness.

The dyeing and printing in Dyeing examples 1 to 6 and Printing example 1 are repeated except for using a compound obtained in one of Examples 4 to 6 in place of the bisazo compounds obtained in Examples 1 to 3. The obtained dyed or printed products have a comparative quality to those obtained in Dyeing examples 1 to 6 or Printing example 1.

What we claim is:
1. A bisazo compound represented by the following general formula:

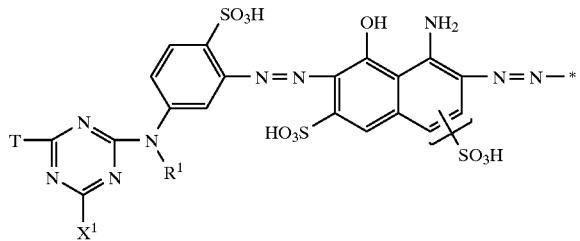

-continued

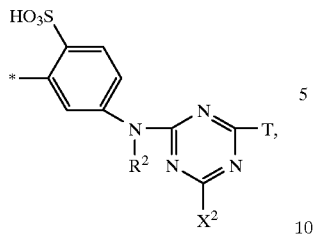

wherein R1 and R2, which are the same as or different from each other, represent hydrogen or alkyl which may be optionally substituted, U represents a group selected from the groups represented by the following formulae (2a), (2b) or (2c):

$$\underset{|}{\overset{R^3}{N}}-A^1-Z^1 \quad (2a)$$

$$\underset{|}{\overset{R^4}{N}}-A^2-Z^2 \quad (2b)$$

$$\underset{|}{\overset{R^5}{N}}-(CH_2)r-Q^1-(CH_2)s-Z^3 \quad (2c)$$

wherein R3 represents hydrogen or alkyl which may be optionally substituted, R4 and R5 represent hydrogen, alkyl which may be optionally substituted or phenyl, A1 represents phenylene which may be optionally substituted or naphthylene which may be optionally substituted, A2 represents alkylene which may be optionally substituted, Q1 represents —O—, —S— or —NR6— wherein R6 represents hydrogen, alkyl which may be optionally substituted or phenyl which may be optionally substituted, r and s, which are the same to or different from each other, represent 2, 3 or 4, Z1, Z2 and Z3 represent a fiber-reactive group selected from the groups represented by the following formulae (3a) and (3b):

$$-SO_2-Y^1 \quad (3a)$$

$$-CONR^7-(CH_2)_m-SO_2-Y^2 \quad (3b),$$

wherein Y1 and Y2, which are the same as or different from each other, represent —CH=CH2 or —CH₂CH₂L wherein L is a group which can be eliminated by the action of an alkali, R7 represents hydrogen or alkyl having 1 to 4 carbon atoms, and m is an integer of 1 to 6, X1 and X2, which are the same as or different from each other, represent a group selected from fluoro, chloro, pyridinio which may be optionally substituted, T represents a non-fiber reactive group represented by the following formulae (4a), (4b) or (4c):

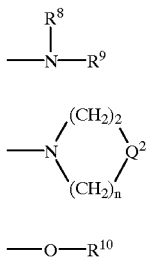

wherein R8 represents hydrogen or alkyl which may be optionally substituted, R9 represents alkyl which may be optionally substituted, cyano or phenyl which may be optionally substituted by one or two substituents selected from alkyl having 1 to 4 carbon atoms, alkoxy having 1 to 4 carbon atoms, carboxy, halogeno, hydroxyl, cyano, carbamoyl, carboxylic ester, amino, acylamino and alkylamino having 1 to 4 carbon atoms, R10 represent hydrogen, alkyl which may be optionally substituted or phenyl which may be optionally substituted, Q2 represents —CH2—, —O—, —S—, —SO₂— or —NR11— wherein R11 represents hydrogen or alkyl which may be optionally substituted, and n is 1, 2 or 3, and one of the two bonds marked with a symbol * means a bond connected to —U and the other means a bond connected to —T;

or a salt thereof.

2. The bisazo compound according to claim 1, wherein $R^1$ and $R^2$ are hydrogen, or a salt thereof.

3. The bisazo compound according to claim 1, wherein $X^1$ and $X^2$, which are the same to or different from each other, represent fluoro or chloro, or a salt thereof.

4. The bisazo compound according to claim 1, wherein $X^1$ and $X^2$, which are the same to or different from each other, represent pyridinio which may be optionally substituted, or a salt thereof.

5. The bisazo compound according to claim 1, wherein U is selected from the groups represented by the formula (2a) or (2b), or a salt thereof.

6. The bisazo compound according to claim 1, wherein $Z^1$, $Z^2$ and $Z^3$ are selected from the groups represented by the formula (3a), or a salt thereof.

7. The bisazo compound according to claim 1, wherein T is selected from the groups represented by the formula (4a), or a salt thereof.

8. The bisazo compound according to claim 1, wherein T is selected from the groups represented by the formula (4b), or a salt thereof.

9. The bisazo compound according to claim 1, wherein T is selected from the groups represented by the formula (4c), or a salt thereof.

10. A method for dyeing or printing a fiber material by applying thereto the bisazo compound or a salt thereof according to claim 1.

* * * * *